Patented Dec. 8, 1942

2,304,232

UNITED STATES PATENT OFFICE 2,304,232

METHOD AND MEANS FOR CONTROLLING DRILLING MUDS

Lorenz K. Ayers, St. Louis, Mo., assignor, by mesne assignments, to National Lead Company, New York, N. Y., a corporation of New Jersey No Drawing. Application June 6, 1936, Serial No. 83,834

4 Claims. (Cl. 252—8.5)

This invention relates to a method and means for controlling drilling muds as used in the drilling of oil, gas and other wells.

In the drilling of oil, gas and other wells, it is customary to circulate a mud-laden fluid having a gel-component through the well in order to lubricate the drill bit and to carry the cuttings out of the hole. The drilling mud also often serves other functions as for instance a means for lining the wall of the bore hole to prevent the loss of water into the formation and to prevent caving of the wall and as a means for keeping down gas pressures.

In some instances the drilling mud is made up of water and cuttings or clay from the bore hole. In other instances special clays or other materials may be used to make up the body of the drilling mud so as to secure the desired characteristics of viscosity, specific gravity, etc., necessary to carry the cuttings out of the hole, to line the walls of the hole and to keep down gas pressures to prevent blowing out of the hole. In many instances the drilling mud has a high colloidal clay content due either to the nature of the formation in which the well is being drilled or to the addition of clay having a high colloidal content which will impart a high viscosity to the mud.

The effect of dissolved metal salts, principally calcium and magnesium, which carry a high electrical ionization charge is to sometimes exert a very great influence on the viscosity and gelling of the drilling muds so that although a mud may be made up of the proper amount of clay and other ingredients to produce the desired viscosity of drilling mud, when these calcium or magnesium or other salt formations are encountered or due to a gradual increase in the percentage of dissolved salts, the viscosity and gelling characteristics of the mud may go up to such an extent as to interfere with the pumping of the mud through the well or to greatly interfere with the settling of the cuttings in the settling ditch. The settling of the cuttings is not alone a matter of viscosity of the drilling mud but is also affected by the gelling characteristics of the mud.

It is therefore the object of my invention to provide a method and means for controlling the viscosity and gelling of the mud within proper limits for satisfactory drilling of the well and to so balance the mud at all times as to prevent excessive ionization of the salts dissolved therein and thereby prevent undesirable increases in viscosity or gelling characteristics of the mud.

Among the materials which have been found suitable for the above purpose are the alkali metal meta and pyrophosphates, such as sodium hexametaphosphate, potassium metaphosphate, lithium metaphosphate, ammonium metaphosphates and sodium pyrophosphates, the sulphuric acid esters of the higher aliphatic alcohols.

While various materials having the property of repressing, sequestering or locking the calcium or magnesium or other ions into a soluble but substantially non-ionized condition are known, such as the alkali metal meta and pyrophosphates above mentioned, the sulphuric acid esters of the higher aliphatic alcohols, etc., I prefer to use sodium hexametaphosphate $Na_2(Na_4P_6O_{18})$ on account of its higher efficiency and lower cost for the purpose prescribed, and the sodium metaphosphate which is slightly acid contains an addition of a small amount of sodium pyrophosphate sufficient to neutralize the acidity of the sodium metaphosphate.

I have found that the addition of as little as .03 of one (1) per cent. of sodium metaphosphate to a drilling mud having high gellation characteristics will quickly reduce the gel formation and at the same time lower the viscosity so as to permit ready settling of the drill cuttings in the settling ditch without, however, causing precipitation of any of the materials forming the body of the drilling mud itself.

While the material may be added in various ways, as by adding the solid salts directly to the drilling mud to become dissolved therein, or to the materials forming the mud, I prefer first to form them into a solution of the desired strength which solution is added gradually to the drilling mud.

The dilute solution is preferably added by dripping or running a small stream into the drilling mud in the ditch or flow line as it flows out of the well where turbulence of the flowing mud is sufficient to mix the dilute reagent throughout the mud with the further advantage of allowing time for the reaction to become complete in the mud storage pits and thus to provide uniform amounts of the alkali metaphosphate throughout the entire column of drilling mud being circulated through the well.

It is also desirable under certain conditions to add the material to the mud in a finely powdered form mixed with clay or other fillers to prevent lumping. This can be accomplished by sprinkling it into the mud in the ditches as it flows from the well thus allowing time for complete solution and uniform distribution before the mud is again pumped into the well.

One addition of the material is usually sufficient to overcome the gelling characteristics of a mud. Where, however, calcium is being added to the mud in substantial amounts from the formation being drilled, it is necessary to make continued small additions sufficient to keep the ionization of the calcium in the mud below that at which coagulation or flocculation and high gellation of the mud occurs. As the material acts in a manner proportionate to the quantities used on the calcium and magnesium or other salts in the drilling mud, any desired degree of suppression or non-suppression may be obtained by varying the amount of the metaphosphate added to the drilling mud, thus giving a very positive control over the gelling characteristics of the mud.

I claim:

1. A drilling mud for wells containing a gel-component and also meta and pyrophosphates with the proportion of the pyrophosphate small compared to that of the metaphosphate but sufficient to neutralize the acidity of the metaphosphate, the said salts being selected from the group consisting of alkali metal and ammonium meta and pyrophosphates.

2. A drilling mud for wells containing a gel-component and also sodium hexametaphosphate and sodium pyrophosphate with the proportion of sodium pyrophosphate small compared to that of the sodium hexametaphosphate but sufficient to neutralize the acidity of the sodium hexametaphosphate.

3. In the art of drilling wells by the employment of a drilling mud containing a gel-component, the process comprising adding to such a drilling mud meta and pyrophosphates with the proportion of the pyrophosphate small compared to that of the metaphosphate but sufficient to neutralize the acidity of the metaphosphate, the said salts being selected from the group consisting of alkali metal and ammonium meta and pyrophosphates.

4. In the art of drilling wells by the employment of a drilling mud containing a gel-component, the process comprising adding to such a drilling mud sodium hexametaphosphate and sodium pyrophosphate with the proportion of the pyrophosphate small compared to that of the metaphosphate but sufficient to neutralize the acidity of the sodium hexametaphosphate.

LORENZ K. AYERS.